Dec. 13, 1932.   A. PETER   1,890,884
METER CALIBRATING APPARATUS
Filed Aug. 24, 1929
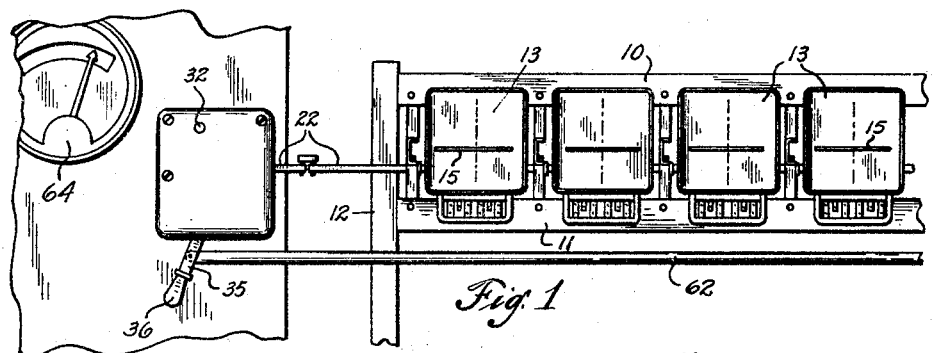
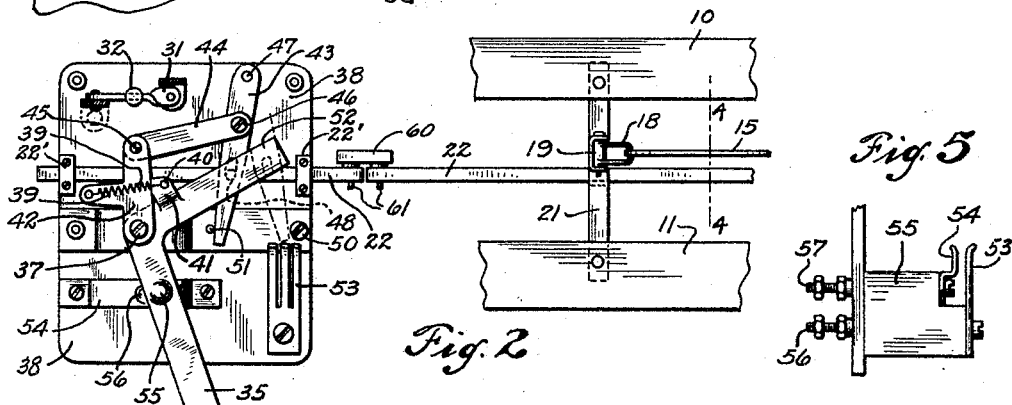
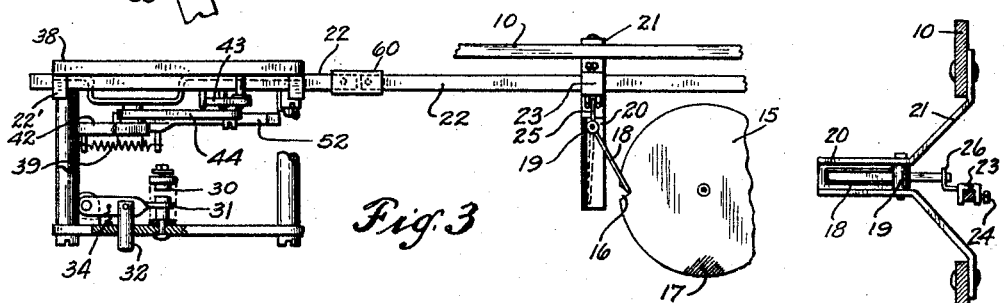
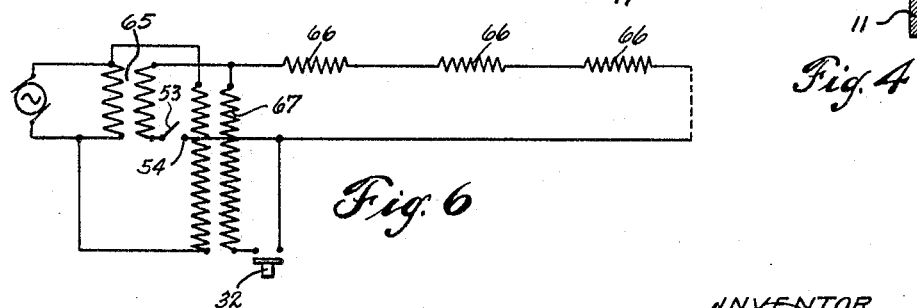
INVENTOR
Adolf Peter
BY
John D. Morgan
ATTORNEY Patented Dec. 13, 1932

1,890,884

UNITED STATES PATENT OFFICE

ADOLF PETER, OF ZUG, SWITZERLAND, ASSIGNOR TO LANDIS & GYR, A.-G., A JOINT-STOCK COMPANY OF SWITZERLAND

METER CALIBRATING APPARATUS

Application filed August 24, 1929, Serial No. 388,184, and in Switzerland August 28, 1928.

This invention relates to the calibration of meters having rotating measuring elements and more particularly to apparatus for simultaneously calibrating a plurality of electricity meters.

Objects and advantages of the invention will be set forth in part hereinafter and in part will be obvious herefrom, or may be learned by practice with the invention, the same being realized and attained by means of the instrumentalities and combinations pointed out in the appended claims.

The invention consists in the novel parts, constructions, arrangements, combinations and improvements herein shown and described.

The accompanying drawings, referred to herein and constituting a part hereof, illustrate one embodiment of the invention, and together with the description, serve to explain the principles of the invention.

Of the drawing:—

Fig. 1 is an elevation of an illustrative embodiment of the present invention showing a form suitable for the calibration of induction meters;

Fig. 2 is a detail elevation of a portion of the apparatus shown in Fig. 1, certain parts being omitted;

Fig. 3 is a plan showing the apparatus of Fig. 2;

Fig. 4 is a detail vertical section taken on the line 4—4 of Fig. 2;

Fig. 5 is a detail of the switching mechanism; and

Fig. 6 illustrates diagrammatically a circuit for use with the illustrated embodiment.

The present invention provides a simple apparatus by which a large number of meters having rotatable measuring elements can be quickly, accurately, and simultaneously calibrated with a minimum of labor. The invention finds its largest field of usefulness in connection with electricity meters of the induction type in which a rotatable disc is driven proportionately to the quantity being measured, but the invention is not limited to this particular type of meter and will be found generally suited for the calibration of meters having a rotatable measuring element.

As embodied, the apparatus of the present invention, includes a plurality of members for frictionally engaging and pressing against the meter discs to prevent their rotation, each being preferably arranged to engage a notch in the corresponding disc and to hold the discs in a uniform position. Means are preferably provided for driving the discs to bring the notch into engagement with the friction elements and other means are provided for simultaneously moving all the friction members into or out of engagement with their respective discs. Means are also preferably provided for simultaneously controlling the driving force tending to rotate the discs and, as embodied, there is provided a switch interconnected with the friction members, so as the members are moved out of engagement with the discs, the driving force acts to rotate the disc, at the same time permitting the members to be moved out of engagement with the disc without applying the driving force.

The remaining objects and features will be set out later in connection with the detailed description, and it will be understood that the foregoing and also the following description is explanatory and exemplary and is not restrictive of the invention.

Referring now in detail to the accompanying drawing illustrating the present embodiment of the invention, there are provided a plurality of supporting bars 10 and 11, parallel with each other and firmly attached to upright standards 12, the supporting bars being suitably spaced apart to engage and hold the meters to be calibrated by the customary lugs on the rear of the meter frames 13. As shown in the drawing, these bars may extend for a considerable distance and are adapted to support a relatively large number of meters for simultaneous calibration. Preferably, means are provided for automatically completing the electrical connections with the terminal boxes of the meters as the meters are put in place on the supporting bars. In the present embodiment, each of the meters to be calibrated is of the type having a rotatable metering element or disc 15, the speed of rotation of which is proportional to the quantity measured by the meter. Each disc 15 is preferably provided with a shallow notch 16 at a uniform point on its periphery, in addition to the usual colored mark 17, now generally employed.

According to the present embodiment, there are provided a plurality of friction members, one for the disc of each meter to be calibrated, these members preferably comprising a loop 18 of relatively fine wire mounted on collar 19 pivotally supported on bracket 20 which forwardly projects from bars 21 supported by and between the supporting rails or bars 10 and 11. Loops 18 are so positioned that as they are swung back and forth they will be moved into and out of engagement with the periphery of the corresponding meter disc 15, frictionally engaging the periphery of the disc or the notch 16 and holding the meter disc against rotation.

For moving the friction members simultaneously into and out of engagement with the corresponding discs 15, there is provided an actuating bar 22 extending throughout the entire length of the supporting bars 10 and 11, and provided with a plurality of settable clips 23, held in position by means of set screws 24 so that the clips are adjacent to the rearwardly extending portions 25 of loops 18. Forwardly extending of the clips 23 are a pair of small fingers 26 between which is received the corresponding rearwardly extending portion 25 of a loop 18. By this arrangement, as the bar 22 is reciprocated, the clips 23 are simultaneously moved causing a simultaneous oscillation of loops 18, which, in turn, results in a simultaneous engagement and disengagement of the loops 18 with the metering discs 15, simultaneously releasing all the metering discs.

Means are provided for rotating the metering discs when the friction members are in contact with the periphery of their respective discs, for setting all the discs at a uniform position with the discs held against further rotation by engagement of the loops 18 with the notches 16. As embodied, there is provided a switch which may comprise normally open contacts 30 and 31 in the input side of the meter circuit and provided with a manually operable plunger 32 to close the contacts against the tension of spring 34, thereby supplying a relatively heavy current to the driving coils of the meters and producing sufficient torque on the discs 15 to rotate the discs against the friction exerted by loops 18. In operation, this switch is held closed until all the meter discs have been sufficiently rotated so that the notches 16 engage the corresponding loop 18, and are uniformly positioned.

Means are provided for controlling the supply of constant current to the driving coils of the meters supported on bars 10 and 11, and this controlling means is preferably interconnected with the means for reciprocating bar 22. As embodied, a lever 35, provided with an insulated handle 36, is pivotally mounted by means of pivot screw 37 secured to a base 38, the movement of this lever 35 being resiliently transmitted to actuating bar 22 by means of spring 39 connected to pin 40 mounted on an offset lug 41 on lever 35. Spring 39 in turn is fastened to link 42 pivotally mounted on screw 37 and connected at its other end to lever 43 by means of link 44, pivot pin 45 and pivot screw 46. Lever 43 is pivotally mounted on base 38 at pivot 47 and is connected to actuating bar 22 by means of a pin and slot connection 48. Bar 22 is preferably slidably mounted on base 38 by means of guides 22'. By means of this mechanism, manual movement of lever 35 is translated into a reciprocatory movement of actuating bar 22. Stops 50 and 51 are preferably provided to limit the resilient movement of lever 43, and consequently the oscillation of loops 18, which are moved thereby. For simultaneously controlling the currents supplied to the meters, lever 35 is preferably provided with an obliquely extending arm 52, of electrically conducting material, to close the gap between switch contacts 53 and 54, in series with the current supply circuit of the meters. Contacts 53 and 54 are preferably mounted on insulating block 55 and connected with binding posts 56 and 57, respectively. As handle 36 is moved to its extreme left position, arm 52 bridges the gap between contacts 53 and 54, completing the circuit and supplying the driving coils of the meters with the necessary constant current.

Means are preferably provided for holding the lever 35 in any of its several positions, and as embodied, lever 35 and a resilient bar 54 are provided with corresponding and cooperating bosses 55 and 56 respectively. In the extreme right hand position of lever 35, boss 56 cooperates with the left hand edge of lever 35; at the central position of handle 36 boss 56 projects within the concavity on the rear face of lever 35; and at the extreme left hand position of lever 35 the boss 56 holds the lever 35 by engagement with the right hand edge of the lever. By means of the above described mechanism, the loops 18 may be held in frictional engagement with the meter discs 15 while the constant current supply is on or off, or the friction members can be released while the constant current supply circuit is open.

For convenience in assembling the calibrating apparatus, actuating bar 22 is preferably made in sections, the adjoining ends of which may be connected together by means of connecting piece 60 provided with pin 61 engaging and passing through corresponding holes in the bar 22.

For operating the switching mechanism and the actuating bars from any point along the line of meters to be calibrated, there may be provided a rod 62 pivotally connected to lever 35 and extending along and beneath the row of meters. By suitable movement of this bar the operator is enabled to watch the operation of any one of the meters, and at the same time control all the operations without returning to the end of the line.

If desired, a standardized ampere meter 64 may be provided in the constant current supply circuit to indicate the strength of the current being supplied to the meters.

In the calibration of alternating current induction meters, the electrical connections may be made in the manner diagrammatically indicated in Fig. 6, where there are provided two transformers, the primaries of which are connected with a suitable supply of relatively constant voltage alternating current, the secondaries of these transformers being connected directly to the meters are arranged in series. Preferably there is provided a transformer 65 for delivering a constant current to the driving coils 66 of the meters connected in series, the output of this transformer being controlled by switch 53, 54. For rotating the discs to initially set them in a uniform position, there is provided a separate transformer 67 for delivering the relatively heavy current to the coils of the meters, the output of this transformer, in turn, being controlled by push button 32.

The operation of the above described apparatus may be briefly summed up, as follows:

With the handle 36 in its central position, so that friction members 18 are released and the switch 53, 54 is open, the operator places the meters to be calibrated on the bars 10 and 11, with the discs 15 in alinement with the loops 18. The operator then moves the handle 36 to its extreme right hand position to press the friction loops 18 into contact with their respective meter discs 15, thereafter presses button 32 to close contacts 30 and 31 to supply the driving coils of each of the meters with a relatively heavy current for rotating the discs of the meters until each disc shall have its notch 16 in engagement with the corresponding loop 18, thereby insuring that the discs of all the meters are uniformly positioned. As soon as all the discs have been uniformly positioned, the operator moves the handle 36 to its extreme left hand position, simultaneously releasing all the friction members, closing the gap between the contacts 53 and 54 and simultaneously setting each of the metering discs 15 in rotation. Lever 35 is allowed to remain in this last position for a definite and predetermined period of time, and the speed of rotation of each of the meter discs is carefully checked by comparing it with the rotation of a standardized meter, or the operator may allow the meter discs to be driven by a constant current of known intensity measured by ampere meter 65 the time of operation being suitably determined by means of a stop watch or other accurate time measuring instrument. With the handle 36 in its central position the meter discs are securely held against creeping, and the relative position of the discs may be determined with reference to the colored marks 17 or the notches 16. If any of the meters are correctly adjusted, they may be removed and replaced by unadjusted meters, after which the inaccurate meters are again adjusted and the calibrating operations are repeated in the manner set forth above.

The synchronized starting of the meter discs from a uniform position, and the positive and simultaneous stopping of the meter discs greatly facilitates and speeds up their calibration, as relatively minute errors of measurement are apparent in the lack of uniformity of the position of the discs at the end of the calibration run.

The invention in its broader aspects is not limited to the specific mechanisms showns and described but departures may be made therefrom within the scope of the accompanying claims without departing from the principles of the invention and without sacrificing its chief advantages.

What I claim is:—

1. Apparatus for the calibration of a plurality of meters of the type having a rotatable metering disc, including in combination means for simultaneously energizing the disc driving means of each of the meters to be tested, and means for uniformly stopping all the discs at a definite point in their rotation.

2. Apparatus for the calibration of a plurality of meters of the type having a rotatable metering disc, including in combination means for simultaneously energizing the disc driving means of each of the meters to be tested, means for stopping each disc at a uniform position, and means for simultaneously releasing all the discs.

3. Apparatus for the calibration of a plurality of similar meters of the type having a rotatable metering disc, including in combination means for simultaneously energizing the means for rotating the disc of each meter to be tested, means for starting all the discs in synchronism with each other, and means for controlling the driving force acting on the discs.

4. Apparatus for the calibration of a plurality of meters of the type having a rotatable metering disc, and means for rotating the disc of each meter to be tested said apparatus including in combination means for stopping each disc at a uniform position, means for simultaneously setting each disc in rotation and means for simultaneously interrupting the driving force acting on each disc.

5. Apparatus for the calibration of a plurality of meters of the type having a rotatable metering disc, including in combination a friction member to engage and hold each disc against rotation, means for simultaneously moving said friction members into and out of engagement with the discs, means for energizing the driving means for the discs to bring them to a uniform starting position, and means for simultaneously driving all of said discs.

6. Apparatus for the calibration of a plurality of meters of the type having a rotatable metering disc, including in combination a friction member to engage and hold each disc against rotation, means for operating the rotating means for the discs to bring them to a uniform starting position, and means for simultaneously releasing the friction members and setting the discs in rotation.

7. Apparatus for the calibration of a plurality of meters of the type having a rotatable metering element and rotating means therefor, including in combination a friction member to engage and hold each element against rotation and for stopping the elements in a uniform position, and means for simultaneously controlling the metered medium supplied to each meter and for releasing the friction member when the medium energizes the meters.

8. Apparatus for the calibration of a plurality of meters of the type having a rotatable metering element, including in combination friction members to engage and hold the meter elements in a uniform position relative to each other, a control means controlling the metered medium supplied to each meter and means for interconnecting the friction members and the control means to energize the meters only when the friction members are released.

9. Apparatus for the calibration of a plurality of meters of the type having a rotatable metering element, including in combination friction members to engage and hold the meter elements in a uniform position relative to each other, a single manually-controlled means for moving the friction members into and out of engagement with the elements, a control means controlling the metered medium supplied to drive the meters when the friction members are out of engagement with the elements and separate control means controlling the driving of the elements to bring them to a uniform starting position.

10. Apparatus for the calibration of a plurality of meters of the type having a rotatable metering disc and means for rotating the discs thereof, including in combination a friction member to engage and hold each disc against rotation and for stopping the discs in a uniform position, means for simultaneously controlling the constant current supply to each meter and for releasing the friction member when the current energizes the meters, and means for simultaneously releasing the friction members and interrupting the current supplied to the meters.

11. Apparatus for the calibration of a plurality of meters of the type having a rotatable metering disc provided with a peripheral notch and having disc-driving means, including in combination stop means adapted to engage a notch in each meter disc, and means for simultaneously energizing the disc-driving means to uniformly position the discs with their notches in engagement with the stop means.

12. Apparatus for the simultaneous calibration of a plurality of meters including a plurality of friction members, one for each meter, to engage the metering elements, and means for simultaneously moving said friction members into and out of engagement with the elements.

13. Apparatus for the simultaneous calibration of a plurality of meters including a plurality of friction members, one for each meter, to engage the metering elements, means for simultaneously moving said friction members into and out of engagement with the elements and means for simultaneously supplying each meter with the metered medium at a uniform rate.

In testimony whereof, I have signed my name to this specification.

ADOLF PETER.